United States Patent

[11] 3,582,607

| [72] | Inventors | Michio Inagaki;<br>Akira Okada, Tokyo, both of, Japan |
|---|---|---|
| [21] | Appl. No. | 762,384 |
| [22] | Filed | Sept. 25, 1968 |
| [45] | Patented | June 1, 1971 |
| [73] | Assignee | The Director of National Research Institute for Metals<br>Tomoyoshi Kawada, Tokyo, Japan |
| [32] | Priority | Oct. 9, 1967, Apr. 13, 1968 |
| [33] | | Japan |
| [31] | | 42/64633 and 42/24322 |

[54] ARC WELDING FOR CONTROLLING WELD PENETRATION
7 Claims, 5 Drawing Figs.

[52] U.S. Cl............................................. 219/137,
219/130, 219/125, 219/131
[51] Int. Cl............................................. B23k 9/00
[50] Field of Search............................................. 219/130,
131, 137, 125 PL, 125, 124; 318/20, 150

[56] References Cited
UNITED STATES PATENTS

| 2,944,141 | 7/1960 | Lourenich | 219/124(PL) |
|---|---|---|---|
| 3,123,705 | 3/1964 | Logan | 219/137X |
| 3,133,186 | 5/1964 | Greene et al. | 219/125(PL) |
| 3,299,250 | 1/1967 | Vilkas et al. | 219/130X |

Primary Examiner—J. V. Truhe
Assistant Examiner—George A. Montanye
Attorney—Anton J. Wille ABSTRACT: An arc-welding process and apparatus are disclosed in which melting conditions and depth of penetration of the arc are detected to permit control of the welding current, welding speed and the like. An insulated electrode, or conductor, is provided connected at one end to the power supply terminal connected to the workpiece, the electrode being disposed within or adjacent to the edges to be welded. An ammeter connected in series with the electrode provides a reading of the shunt current as the welding arc approaches and reaches the electrode, the shunt current providing the means for controlling the welding current, welding speed, and the like.

ARC WELDING FOR CONTROLLING WELD PENETRATION

This invention relates to arc-welding technique, more particularly to process for performing arc welding while controlling the arc by electrically detecting the existing melting conditions especially the depth of penetration and apparatus for use in arc welding.

The depth of penetration is the most important factor which determines the welding conditions in arc welding. Thus, the arc welding should be performed upon selectively defining the welding conditions such as welding current, welding speed, arc voltage and the like in conformity with the groove conditions of the joint in order to accomplish a complete penetration in the welded joint. Heretofore, it was impossible to correctly detect the depth of penetration into the joint during the welding operation. In arc welding in the prior art, a welding operator directly monitored by visual test where the arc was generated between the edges of the joint and to infer the depth of penetration from the position in which the arc reaches the edges. The arc was accordingly controlled. In this case, however, it is difficult to precisely confirm the position where the arc reaches in the edges. On the other hand, it is impossible to monitor the situation of the arc by visual test as in the case of arc welding performed within the flux, as in submerged arc welding. However, when the groove conditions are not uniform throughout the weld length, it is vital to supervise the variation of the penetration caused by irregularities of the groove conditions.

Therefore, an object of the invention is to provide a novel welding process capable of monitoring the melting position within the base metal easily and to control the welding current during the operation accordingly.

Another object of the invention is to provide an improved welding apparatus which is capable of electrically detecting the melting situation within the base metal during arc welding to attain the desired weld penetration.

An aspect of the invention is to detect the melting situation within the base metal easily and quickly by a welding operator during the operation of welding, and hence it makes possible for the operator to effectively adjust the welding conditions and the position of welding torch, thereby to increase the reliabilities of the weld and, in addition, to contribute to the increase of the efficiencies of the welding operation.

Another aspect of the invention is to maintain the depth of penetration at the desired value by automatically adjusting the welding current upon the detection of the existing melting situation.

Another aspect of the invention is to enable continuous maintenance of the welding arc along the welding line by automatically moving a welding torch in accordance with the detection of the position where the arc generates during the welding operation.

Further another aspect of the invention is to detect the width and reinforcement height of the "Uranami" bead ("uranami" bead means a sound bead which is formed on the reverse side by welding from one side and has uniform ripple) during the welding operation on one side, and to obtain a uniform and sound "Uranami" bead by adjusting the welding current to an optimum level in accordance with the detected result.

In accordance with one embodiment of the invention, a single insulated electrode of metal wire or metal plate is connected at one end to the welding power supply terminal connected to the workpiece and positioned along the whole length of the joint to be welded prior to the welding operation. During the operation, a shunt current flowing through the electrode is measured to detect whether the arc is at the predetermined position for controlling the welding arc.

When the welding arc touches the electrode disposed in the groove of the joint and the metal portion of the electrode is exposed to the welding arc, an arc is locally generated between the exposed portion of the electrode and the welding wire (rod), with the result that a large amount of shunt current flows through the electrode. In this case, the electrode is gradually melted in consequence of the advancement of the welding. When the welding arc does not reach the electrode disposed in the groove of the joint and the electrode engages the melting metal without being exposed to the arc, a small amount of the shunt current flows through the electrode. On the other hand, should the welding arc be generated over the groove of the joint and the electrode does not come in contact with the melting metal, the shunt current scarcely flows through the electrode, and thus the electrode remains in the groove without melting. It is apparent from the foregoing discussion, that if the shunt current flowing through the electrode arranged at a predetermined position within the groove of the joint is measured, it is possible to detect the melting condition and penetration situation in the groove. With the present invention, it is possible to maintain the conditions constant under which the arc generated in the groove maintains the melting condition so that the depth of penetration is constant. Thus, optimum welding conditions are achievable by automatically or manually adjusting the welding current and/or arc voltage supplied from the power supply in accordance with information based upon the measured result of the shunt current flowing through the electrode.

In another embodiment of the invention, a group of electrodes coated with an insulator or insulators is positioned within the groove or on one side of the base metal. The group of electrodes may be made of a plurality of metal wires or metal plates. The end of each electrode of the group is electrically connected to a common terminal through which an welding power supply is electrically coupled to the base metal. When the welding arc or melting metal comes into contact with some or all of the electrodes, respective shunt circuits are formed through such electrodes, with the result that the shunting current flows through each of the formed shunting circuits. Accordingly, during the welding operation, the dimension of the melting metal can be detected by sensing a combination of the electrodes and the number of the electrodes through which the shunt current flows by means of the indicating means connected in series with each electrode.

In the first embodiment as set forth above, it is desired to detect the situation of a generated welding arc in the groove by measuring the shunt current flowing through the electrode disposed in the vicinity of the groove of a joint. In the second embodiment, it is desired to detect the dimension of the melting metal such as the width and/or depth of penetration by sensing a number of the parallel connected and positioned electrodes through which shunt current flows.

The above mentioned and other objects, aspects and advantages of the invention will be more apparent from the following description referring to the accompanying drawing, in which.

Figure 1:
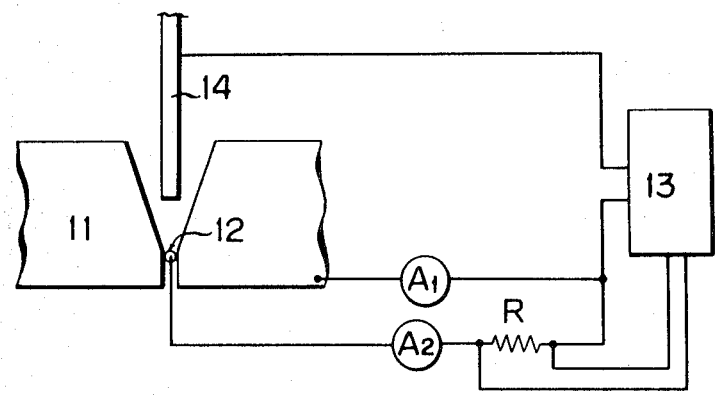
FIG. 1 shows a schematic diagram of the welding apparatus illustrative of one embodiment in accordance with the invention.

Referring now to FIG. 1, the base metal 11 has V-groove joint. The base metal 11 is connected to one terminal of a welding power supply 13 through a series connected ammeter A the other terminal of the power supply a welding rod 14 being connected in the usual manner to form a closed loop for the welding current. The insulated electrode 12 consisting of a metal wire or metal plate is positioned between the edges of the joint to be welded, and one end of the insulated electrode 12 toward which the arc is advanced is connected to the common terminal at the power supply that is connected to the base metal via a path comprising an ammeter $A_2$ and a resistor R. Thus, the path having the ammeter $A_2$ and the resistor R forms a shunting circuit.

The insulated electrode 12 is advantageously formed from metal wire on the order of 0.5 to 6 mm. in diameter or metal plate on the order of less than 1 mm. in thickness and less than 8 mm. in width.

The electrode may be selected from metal materials which are the same as base metal materials or metals which have high conductivities such as copper, aluminum and the like. The electrode is covered with an insulating coating. The insulated electrode 12 is positioned between the edges of the base metal over the whole length of weld length. The shunt current of the electrode 12 flows through the shunting path, and the variation of the shunt current being detected by the ammeter $A_2$ in the shunting circuit. The voltage appearing across the resistor R in the shunting circuit is led to a control unit (not shown) in the power supply 13 to automatically adjust welding current supplied to the welding rod 14.

Figure 2:
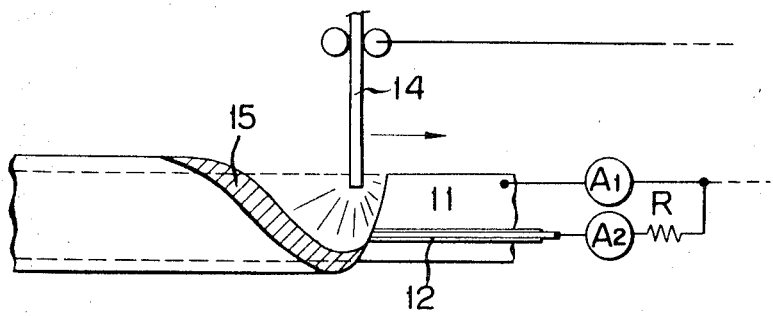
FIG. 2 shows a partial schematic diagram of the welding apparatus of FIG. 1 during the welding operation.

In operation, as being shown in FIG. 2, when the welding arc arrives at the electrode 12 positioned suitably within the edges of the base metal 11, the electrode 12 is exposed instantaneously to the arc and the arc causes the shunting current to flow through the electrode 12. The electrode is continuously and gradually exposed to the arc in the direction of the forward advance of welding because of the movement of the welding rod 14, and therefore the current flows through the electrode 12 before the exposed portion of the electrode is fused by the arc heat. When the welding arc arrives at the constant depth within the base metal, the shunting current flowing through the electrode 12 exhibits a constant value. However, when the electrode 12 is not exposed to the arc and contacts with melting weld metal, there is little shunt current flowing through the electrode 12. The more the arc diverges from the electrode, the greater will be the decrease in the shunt current through the electrode. For instance, an electrode of flux coated steel wire of 0.8 mm. in diameter was positioned on the root surface, with 3 mm. in height, in V-groove joint of 9 mm. in thickness of the plate. When the arc welding was carried out with 200 A. of welding current, the shunt current flowing through the electrode was on the order of 20 A. and in this case the depth of penetration reached the back surface of the joint. Under such condition, it was realized that, when the electrode was about 2 mm. from the welding arc, the shunt current reduced to less than 5 A. and the arc did not quite reach the electrode 12. In this manner, it was feasible to detect from the abrupt variation of the shunt current in the electrode 12, whether the arc reached the position where the electrode was laid, an from this it was possible to determine the position at which the arc was generated.

In accordance with one embodiment of the invention, as described hereinbefore, a single insulated electrode of metal wire or metal plate is located between both edges or on the back of the joint along the whole length, and the electrical connection is established between one end of the electrode toward which the welding operation is advanced, and the common terminal of the power supply also connected to the base metal. With such arrangement, the position where the arc is generated can be estimated by measuring the shunt current flowing through the shunting circuit or detecting the voltage appearing across the resistor R included in the shunting circuit. Then in accordance with detected current or voltage the welding arc can be controlled by compensating the welding current or arc voltage so that the arc is maintained at the desired position.

Figure 3A:
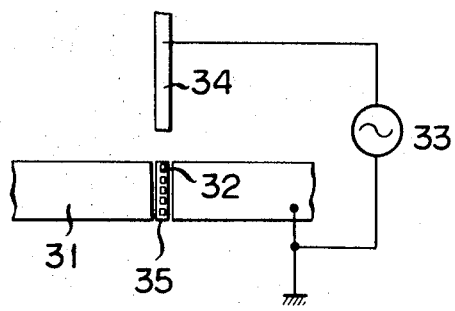
FIG. 3A shows a schematic diagram of one welding arrangement illustrative of another embodiment in accordance with the invention.
Figure 3B:
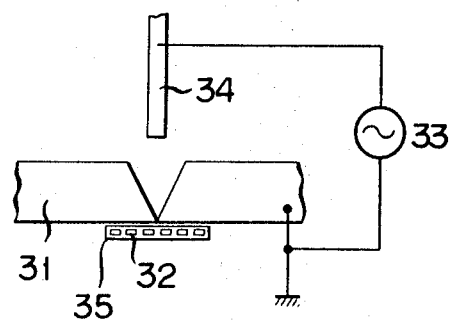
FIG. 3B shows a schematic diagram of the other welding arrangement similar to that of FIG. 3A.
Figure 4:
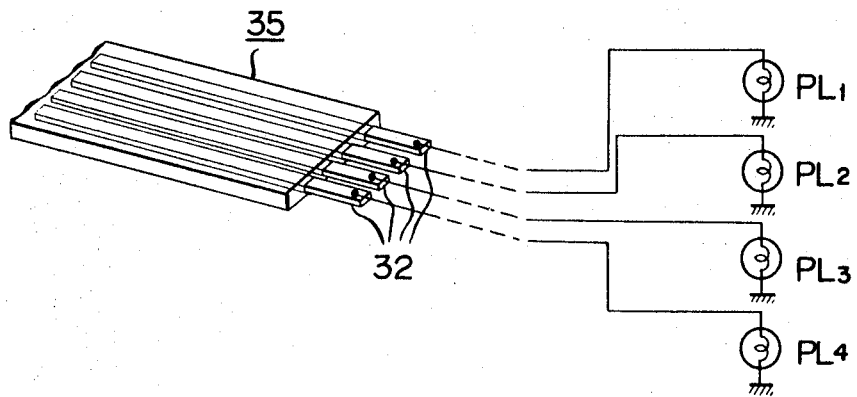
FIG. 4 shows a perspective view of a set of the insulated electrodes and connections associated therewith for use in the welding arrangements shown in FIGS. 3A and 3B.

FIG. 3A and FIG. 3B show other embodiments of the invention in which two plates are to be butt welded, the plates forming an I-groove (FIG. 3A) or a V-groove (FIG. 3B), a set of electrodes 32 being positioned within the I-groove joint and on the back of V-groove joint, respectively. The set of electrodes 32 is made of a plurality of metal wires or metal plates with insulating coating 35 disposed thereon. The set of electrodes as shown in FIG. 4 is formed so that a plurality of electrodes made of metal wires or metal plates are arranged spaced apart from one another and coated with insulating material. Alternately, the set of electrodes may be formed by arranging a plurality of coated wires side by side with spacing therebetween. Although the set of electrodes may take many various forms other than such forms as mentioned herein, it is required to construct the set of electrodes so as to derive shunt currents separately and individually in the separate circuits from the different electrodes. The number of the electrodes may be determined in accordance with the area intended to be fused in the base metal.

As shown in FIG. 4, electrical connections are provided at the ends of the respective electrodes, toward which the arc approaches progressively during the welding operation. These ends of the electrodes are connected, by leads, to the terminals of the power supply to which the base metal is connected. In FIG. 3A, 3B and 4, for simplicity, one terminal of the power supply 33 is grounded, and therefore one end of the respective leads for the shunting circuits is connected to ground. Respective indicating means such as pilot lamps $PL_1$ through $PL_4$ are connected to the respective leads connected to the electrical connecting ends of the electrodes. Thus, each of the shunting circuits comprises one electrode and one indicating means, and therefore similar several shunting circuits are formed as shown in FIG. 4. The indicating means included in each shunting circuit may take any form such as, for example, a tungsten lamp (preferably ratings being on the order of 1—2 volt), a neon lamp or other discharge lamps, or an ammeter. In such case, a transformer may be used to step up the voltage of the shunting circuit.

In the operation of welding, when the base metal 31 is fused by the arc, one or more of the electrodes of the set of electrodes 32 which are disposed at the joint are also fused simultaneously. The fusion of the electrodes 32 is caused by exposure to the arc or by contact with the melting weld metal. Under such circumstances, the closed loop for current is formed from the welding arc or the melting weld metal to the electrodes 32, and therefore the shunt current flows through one or more of the shunting circuits to energize the pilot lamp or lamps. When shunt current flowing through any shunting circuits exceeds the predetermined value, the pilot lamps associated therewith turn on, and the larger the current flow through each shunting circuit, the brighter the pilot lamp lights up.

In the embodiment as shown in FIG. 3A in which the set of electrodes are disposed within I-groove joint in parallel therewith, the flow of current through one upper electrode is followed by the flow of current through the next succeeding electrode in sequence. In other words, if the pilot lamp $PL_1$ is connected to the uppermost electrode in FIG. 3A and the pilot lamp $PL_4$ is connected to the lowermost electrode of the set of electrodes, the pilot lamp $PL_1$ turns on in the first place, and following this the pilot lamp $PL_2$ turns on sequentially. Therefore the depth of penetration can be recognized by the successive illumination of the pilot lamps.

In the embodiment illustrated in FIG. 3B in which the set of electrodes is arranged on the back of the V-groove joint, shunt currents will flow through one or more of the electrodes opposite the welding arc or in contact with the fused portion of the back of the base metal. The currents flowing through the respective shunting circuits will energize the pilot lamps associated with each shunting circuit. As a consequence, the width of the "Uranami" bead and the position at which the "Uranami" bead is formed on the back of the base metal can be determined from the lighted pilot lamps. And furthermore the reinforcement height of the "Uranami" bead can be determined by the change of the distance from the back of the joint to the set of electrodes. More precisely, it is feasible to determine the magnitude and the position of the weld in the base metal from the number and the combination of the lighted pilot lamps.

With the arrangement as shown in FIG. 3B, the following experiment was made: A set of electrodes was prepared by arranging six electrodes made of aluminum foils of 0.03 mm. in thickness and 3 mm. in width at intervals of 2 mm. and in parallel with one another and by binding them with insulating adhesive tapes. Advantageously, the insulating adhesive was transparent for handling the set of electrodes. The set of electrodes so prepared was positioned on the back of the steel plate of 20 mm. in thickness provided with bevelled edges of approximately 50°; the interleaved backing flux being approximately 2 mm. in thickness. Each of the shunting circuits was formed by connecting each of the leads including the respective pilot lamp to one of the ends of the corresponding electrode toward which the arc is advanced during the operation and connecting the other ends of the leads to the grounded terminal of the power supply. Submerged arc welding was then performed with 800 A. of welding current at the welding speed of 40 cm./min. The electrodes which faced the "Uranami" bead were fused and at the same time the voltage on the order of 1 through 3 volts was developed in the associated shunting circuits, so that the pilot lamps corresponding thereto were energized, while the electrodes opposite the nonfused portion of the base metal were not fused. In such manner as described herein, the width of the "Uranami" bead could easily be determined from the number of lighted pilot lamps.

In a modified form of the invention, two electrodes may be disposed in parallel on the opposite edges of the joint. In this case, it is possible to detect the deviation of welding arc from the welding line. It is feasible to compensate for the deviation of the welding rod or torch by means of a guidance system (not shown) which can move the welding rod or torch in accordance with the detected deviation. The guidance system is well known and any type of system may be applied to the invention.

It should be noted that the invention is not limited to the illustrated embodiments and many other changes and improvements may be made by one skilled in the art without departing from the spirit and the scope of the invention.

What we claim is:

1. A method of arc control comprising the steps of; forming a weld joint on workpieces to be joined; disposing at least one electrode adjacent to the weld joint and insulated therefrom; establishing an arc between an end of a welding electrode and the workpiece along the joint; shunting arc current through said at least one insulated electrodes; and sensing the current through said at least one insulated electrode to determine the penetration.

2. A method of arc control according to claim 1, wherein said at least one insulated electrode comprises a group of electrodes disposed in parallel with and insulated from each other, disposing the group of electrodes within said joint perpendicular to a surface of said workpiece, and sensing the shunting current through each of the insulated electrodes.

3. A method of arc control according to claim 1, wherein said at least one insulated electrode comprises a group of electrodes disposed in parallel with and insulated from each other, disposing the group of insulated electrodes adjacent to the joint of said workpiece, and sensing the shunting current through each of the insulated electrodes.

4. A method of arc control according to claim 1, wherein said at least one insulated electrode comprises a pair of electrodes, disposing the pair of electrodes in spaced, parallel positions with each other and on opposite sides of the joint and sensing the shunting current through each of the insulated electrodes.

5. Arc-welding apparatus comprising in combination; a workpiece defining a weld joint; a welding electrode; at least one electrode disposed adjacent to the joint of the workpiece and insulated therefrom; means for supplying current sufficient to establish an arc between the welding electrode and workpiece and the welding electrode and said at least one insulated electrode, and means for indicating a value of current flowing through said at least one insulated electrode.

6. Arc-welding apparatus according to claim 5, wherein said at least one insulated electrode comprises a group of electrodes, each of the electrodes of the group being connected at one end to a common terminal of said means for supplying current to provide shunting circuits and each a plurality of shunting circuit including respective indicating means.

7. Arc-welding apparatus according to claim 5, wherein said at least one insulated electrode comprises a pair of electrodes spaced from and in parallel with each other, the pair of electrodes being positioned on opposite sides of the joint to provide a pair of shunting circuits each including respective indicating means to sense a deviation of the arc from a welding line during a welding operation.